(12) United States Patent
Brown et al.

(10) Patent No.: US 7,996,621 B2
(45) Date of Patent: Aug. 9, 2011

(54) DATA CACHE INVALIDATE WITH DATA DEPENDENT EXPIRATION USING A STEP VALUE

(75) Inventors: Jeffrey Douglas Brown, Rochester, MN (US); Russell Dean Hoover, Rochester, MN (US); Eric Oliver Mejdrich, Rochester, MN (US); Kenneth Michael Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 11/776,731

(22) Filed: Jul. 12, 2007

(65) Prior Publication Data

US 2009/0019228 A1     Jan. 15, 2009

(51) Int. Cl.
*G06F 12/12* (2006.01)
(52) U.S. Cl. .................. 711/133; 711/E12.072; 345/557
(58) Field of Classification Search .................. 711/133, 711/159, E12.072; 345/557
See application file for complete search history.

(56) References Cited

U.S. PATENT DOCUMENTS

| | | | |
|---|---|---|---|
| 7,103,720 B1 * | 9/2006 | Moy et al. ...................... | 711/122 |
| 7,664,916 B2 * | 2/2010 | Griffin et al. .................. | 711/115 |
| 2003/0084250 A1 * | 5/2003 | Gaither et al. ................. | 711/133 |
| 2003/0084251 A1 * | 5/2003 | Gaither et al. ................. | 711/133 |
| 2006/0143392 A1 * | 6/2006 | Petev et al. .................... | 711/133 |
| 2006/0170693 A1 * | 8/2006 | Bethune et al. ................ | 345/568 |
| 2007/0198978 A1 * | 8/2007 | Dice et al. ..................... | 718/100 |
| 2007/0239943 A1 * | 10/2007 | Dice et al. ..................... | 711/147 |
| 2008/0301378 A1 * | 12/2008 | Carrie ............................ | 711/147 |

OTHER PUBLICATIONS

Alvin R. Lebeck and David A. Wood. "Dynamic Self-Invalidation: Reducing Coherence Overhead in Shared-Memory Multiprocessors." 1995. ACM. ISCA '95.*
Hoichi Cheong and Alex Veidenbaum. "A Version Control Approach to Cache Coherence." 1989. ACM. ICS '89.*
Stefanos Kaxiras, Zhigang Hu, and Margaret Martonosi. "Cache Decay: Exploiting Generational Behavior to Reduce Cache Leakage Power." 2001. ACM. ISCA '01.*
Ravi Rajwar, Maurice Herlihy, and Konrad Lai. "Virtualizing Transactional Memory." 2005. IEEE. ISCA '05.*
John L. Hennessy and David A. Patterson. Computer Architecture: A Quantitative Approach. 2003. Morgan Kaufmann. 3rd Ed. pp. 554-555.*
Sven Woop, Jörg Schmittler, and Philipp Slusallek. "RPU: A Programmable Ray Processing Unit for Realtime Ray Tracing." Jul. 2005. ACM. ACM Transactions on Graphics (TOG). vol. 24. pp. 434-444.*

* cited by examiner

*Primary Examiner* — Reginald G Bragdon
*Assistant Examiner* — Nathan Sadler
(74) *Attorney, Agent, or Firm* — Patterson & Sheridan LLP

(57) ABSTRACT

According to embodiments of the invention, a step value and a step-interval cache coherency protocol may be used to update and invalidate data stored within cache memory. A step value may be an integer value and may be stored within a cache directory entry associated with data in the memory cache. Upon reception of a cache read request, along with the normal address comparison to determine if the data is located within the cache a current step value may be compared with the stored step value to determine if the data is current. If the step values match, the data may be current and a cache hit may occur. However, if the step values do not match, the requested data may be provided from another source. Furthermore, an application may update the current step value to invalidate old data stored within the cache and associated with a different step value.

20 Claims, 14 Drawing Sheets

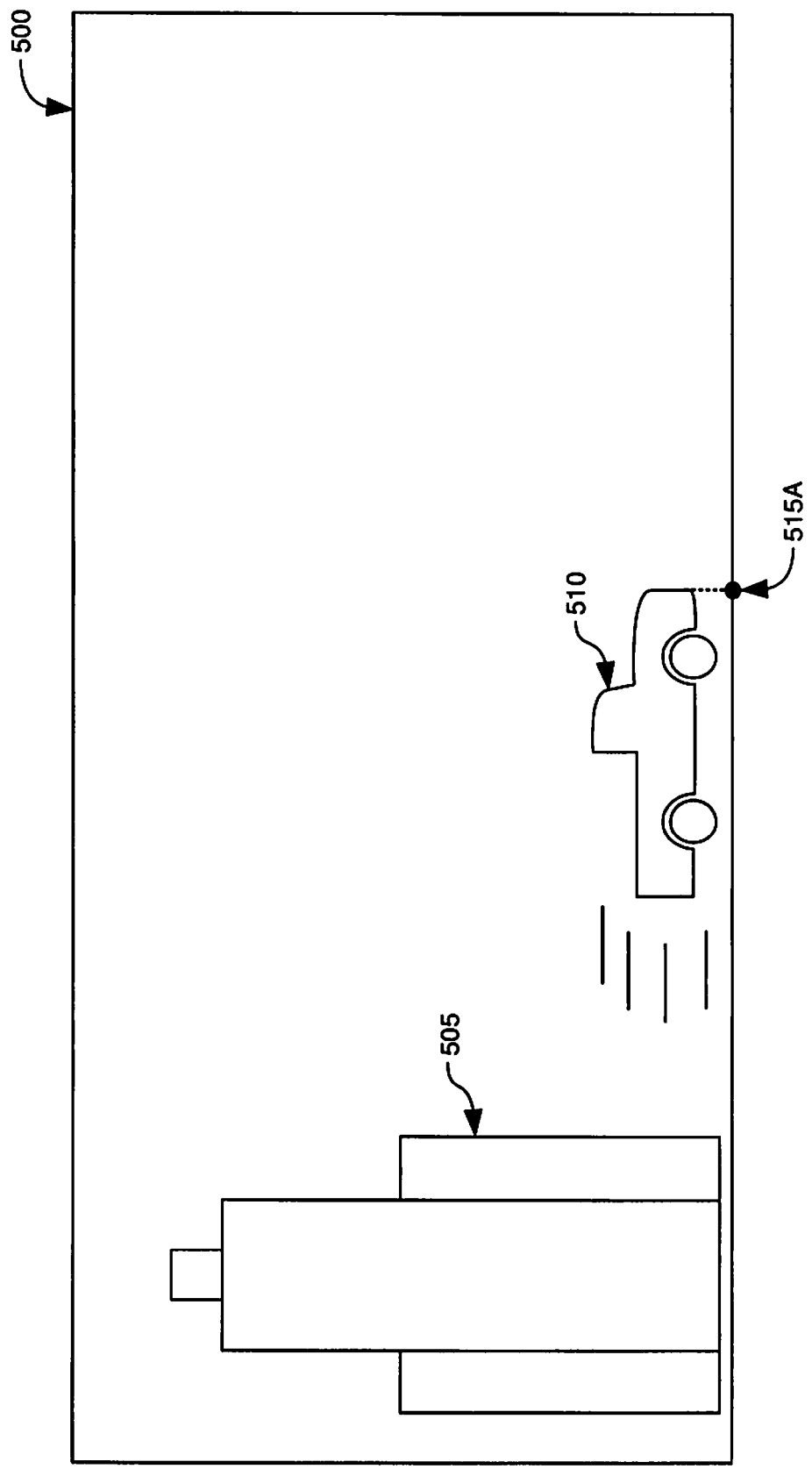

DATA CACHE INVALIDATE WITH DATA DEPENDENT EXPIRATION USING A STEP VALUE

BACKGROUND OF THE INVENTION

1. Field of the Invention

Embodiments of the invention generally relate to the field of computer processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two-dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two-dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two-dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for managing data within a memory cache which may be used to perform ray tracing.

According to one embodiment of the invention a method of managing data in a memory cache is provided. The method generally comprising: setting a first current step value; creating a cache directory entry having a local step value, wherein the cache directory entry corresponds to data within the memory cache; receiving a request for data at an address corresponding to the cache directory entry; and comparing at least the local step value with the first current step value to determine if at least one of a cache hit or a cache miss occurs.

According to another embodiment of the invention, a computer readable storage medium containing a program is provided. The program, when executed, performs operations generally comprising: setting a first current step value; creating a cache directory entry having a local step value, wherein the cache directory entry corresponds to data within the memory cache; receiving a request for data at an address corresponding to the cache directory entry; and comparing at least the local step value with the first current step value to determine if at least one of a cache hit or a cache miss occurs.

According to another embodiment of the invention a system is provided. The system generally comprising: a first processing element; and a memory cache associated with the first processing element. The memory cache generally comprising: a cache data store; a cache directory; and a cache controller containing a current step value, and the cache controller generally configured to: create a cache directory entry in the cache directory having a step value equal to the current step value and the cache directory entry corresponding to data within the cache data store; receive a request for data at an address corresponding to the memory directory entry; and in response to receiving the request for data, compare the step value of the cache directory entry with the current step value to determine if at least one of a cache hit or a cache miss occurs.

BRIEF DESCRIPTION OF THE DRAWINGS

FIGS. 5 and 7 illustrate a three-dimensional scene to be rendered by an image processing system, according to one embodiment of the invention.

DETAILED DESCRIPTION OF THE PREFERRED EMBODIMENTS

Figure 1:
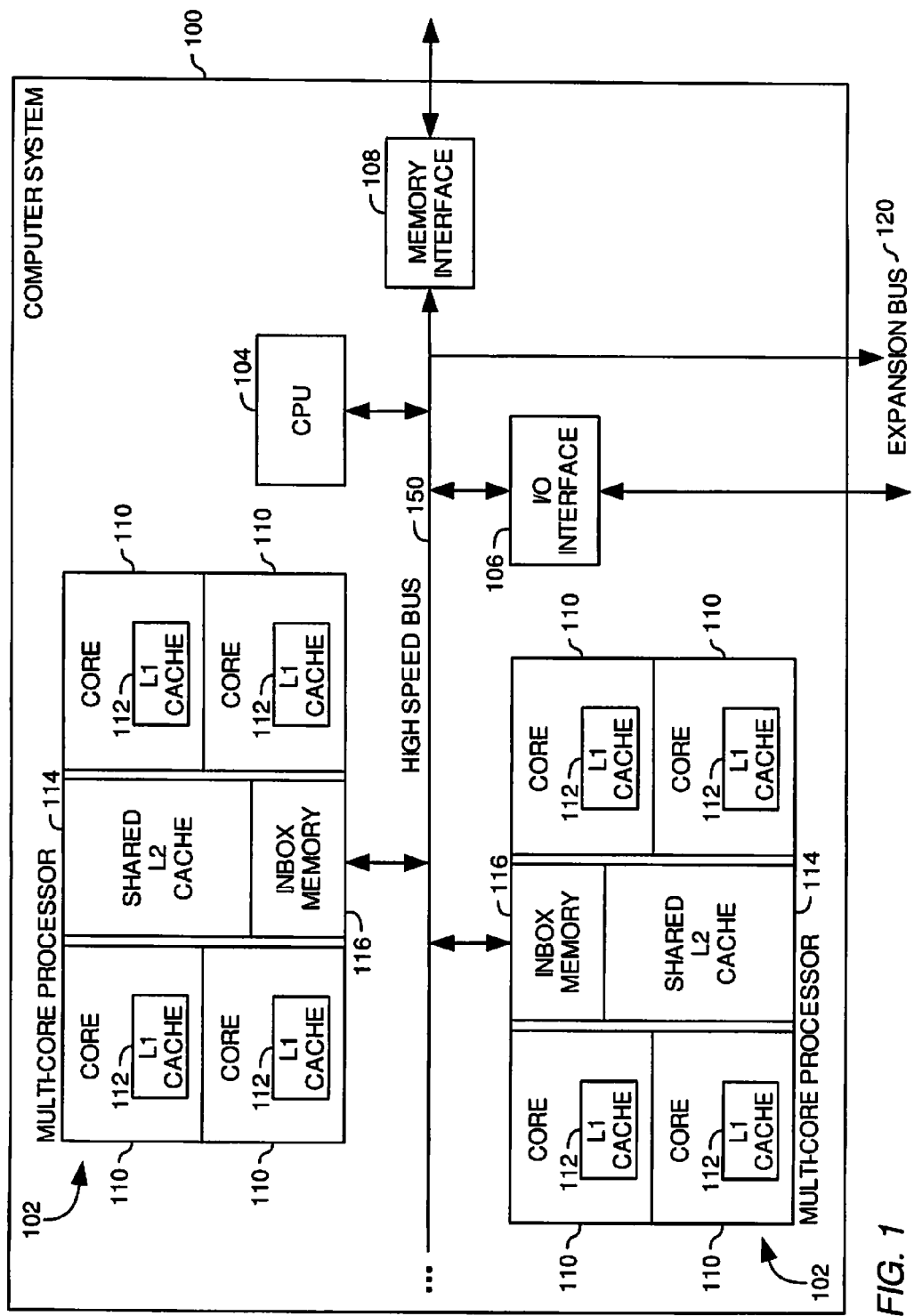
FIG. 1 illustrates a computer system, according to one embodiment of the invention.

Embodiments of the invention provide methods and apparatus for updating and invalidating select portions of a memory cache while maintaining the validity of other portions of the memory cache. According to one embodiment of the invention, a step value may be associated with a data which is stored within a plurality of memory caches associated with a plurality of processing elements. When data is written to the cache memory, a step value may be stored within a corresponding cache directory entry. When data is read from the cache, along with an address comparison a current step value may be compared with a step value associated with the data stored within the memory cache. If the step value matches, the corresponding data is current the data stored within the cache may be provided to the processor. However, if the step value does not match, the cache compare is considered a miss and data may be provided from another source.

Furthermore, according to embodiments of the invention, software may update the data structure by writing new data into the cache for the data structure along with a new step value. When the new data structure is ready to be used, software may update the current step value to match the new step value. By updating the current step value to match the new step value, all cache entries which have an old step value or have a step value which does not match the current step value are effectively invalidated thereby eliminating the need for software or hardware to invalidate the old cache entries related to the data structure.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Program Products Used with a Computer System

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Computer System

FIG. 1 is a block diagram depicting the computer system 100 according to one embodiment of the invention. The system 100 may contain a one or more multi-core processors 102. Each multi-core unit 102 may include multiple cores 110 each arranged around a shared level two cache (L2 cache)

114. The shared L2 cache 114 may include a portion of memory, referred to herein as inbox memory 116, which, as described below, may be used to manage memory access for threads being executed by the cores 110 in a multi-core unit 102. Each core 110 may also include a level one cache (L1 cache) 112 which, in some cases, may be used exclusively by that core 110.

In some cases, the system 100 may also include a further central processing unit (CPU) 104 which, in some cases, may provide additional processing functionality. The system 100 may also include an input/output (I/O) interface 106 and a memory interface 108 which may be used to communicate with external I/O device and additional system memory, respectively. Each of the components within the system may communicate across a high speed processor bus 150. The system 100 may also include an expansion bus 120 which may be used to connect the multi-core processor to additional system components. While depicted as separate components of a computer system 100, in some cases, two or more of the items depicted in FIG. 1 may be combined as part of a system on a chip (SOC).

Each processor core 110 may contain a plurality of processing threads and a core cache (e.g., an L1 cache). The processing threads located within each processor core 110 may have access to the shared L2 cache 114.

The processor cores 110 may also have access to a plurality of inboxes within the inbox memory 116. The inboxes may be memory mapped address space. The inboxes may be mapped to the processing threads located within each of the processor cores 110. Each thread located within the processor cores 110 may have a memory mapped inbox and access to all of the other memory mapped inboxes. The inboxes may make up a low latency and high bandwidth communications network used by the processor cores 110.

The processor cores 110 may use the inboxes as a network to communicate with each other and redistribute data processing work amongst the processor cores 110. For some embodiments, separate outboxes may be used in the communications network, for example, to receive the results of processing by processor cores 110. For other embodiments, inboxes may also serve as outboxes, for example, with one processor core 110 writing the results of a processing function directly to the inbox of another processor core 110 that will use the results.

The aggregate performance of an image processing system may be tied to how well the processor cores 110 can partition and redistribute work. The network of inboxes may be used to collect and distribute work to other processor cores 110 without corrupting the shared L2 cache 114 with processor cores 110 communication data packets that have no frame to frame coherency. An image processing system which can render many millions of triangles per frame may include many processor cores 110 connected in this manner.

In one embodiment of the invention, the threads of one processor core 110 may be assigned to a workload manager. An image processing system may use various software and hardware components to render a two-dimensional image from a three-dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three-dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element processor cores 110 on the multiple core processing element 100 may be vector throughput engines. After a workload manager determines a ray-bounding volume intersection, the workload manager may issue (send), via the inboxes, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
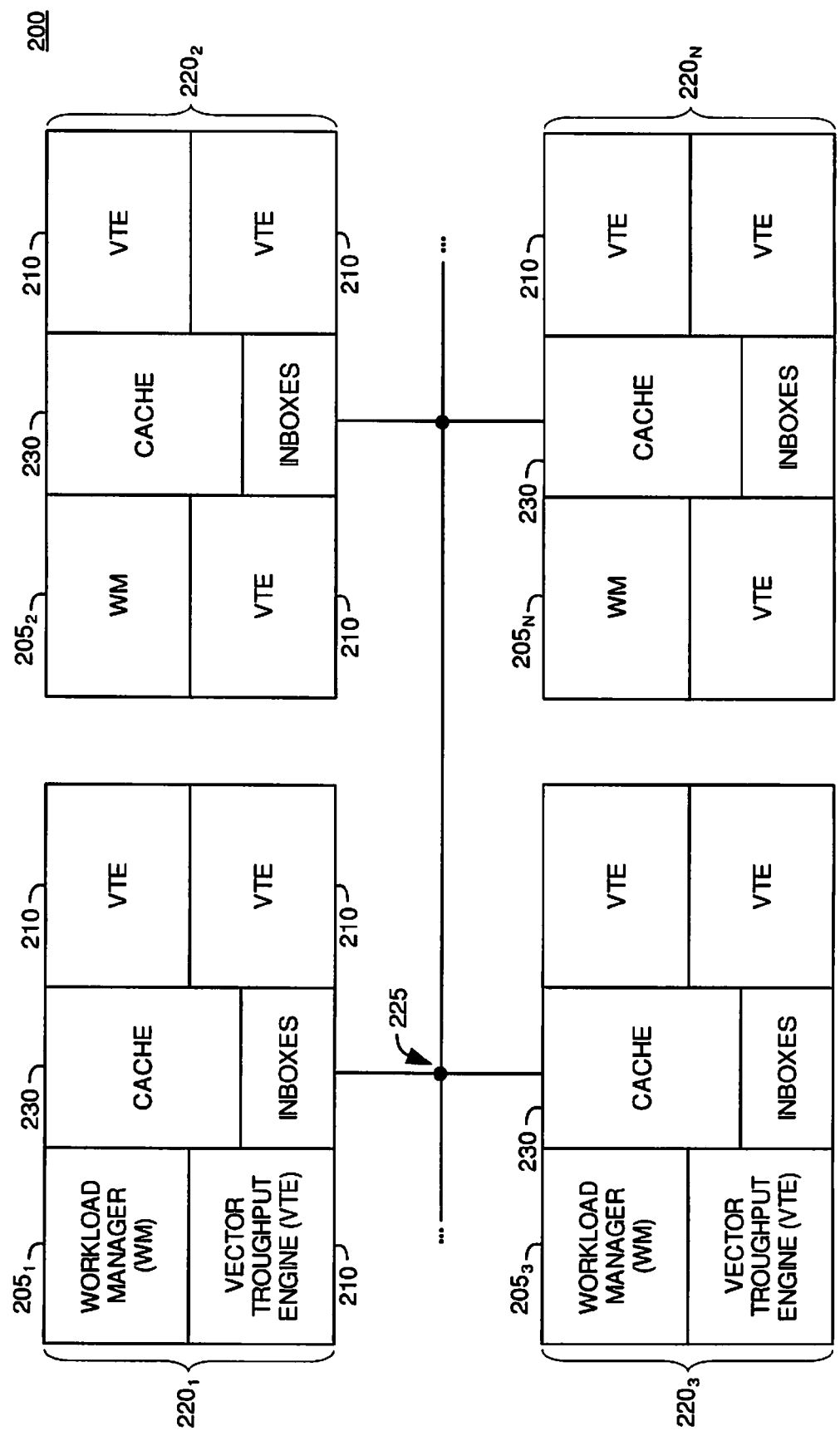
FIGS. 2 illustrates exemplary multiple core processing elements, according to embodiments of the invention.

FIG. 2 illustrates a network of multiple core processors 200, according to one embodiment of the invention. FIG. 2 also illustrates one embodiment of the invention where the threads of one of the processor cores 110 of the multiple core processor 102 is a workload manager 205. Each multiple core processor $220_{1-N}$ in the network of multiple core processing elements 200 may contain one workload manager $205_{1-N}$, according to one embodiment of the invention. Each multiple core processor $220_{1-N}$ in the network of multiple core processors 200 may also contain a plurality of vector throughput engines 210, according to one embodiment of the invention.

The workload managers $205_{1-N}$ may use a high speed bus 225 (e.g., similar to the high speed processor bus 150 illustrated in FIG. 1) to communicate with other workload managers $205_{1-N}$ and/or vector throughput engines 210 of other multiple core processing elements $220_{1-N}$ according to one embodiment of the invention. Each of the vector throughput engines 210 may use the high speed bus 225 to communicate with other vector throughput engines 210 or the workload managers $205_{1-N}$. The workload manager processors 205 may use the high speed bus 225 to collect and distribute image processing related tasks to other workload managers $205_{1-N}$, and/or distribute tasks to other vector throughput engines 210. The use of a high speed bus 225 may allow the workload managers $205_{1-N}$ to communicate without affecting the caches 230 with data packets related to workload manager communications.

An Exemplary Three-Dimensional Scene

Figure 3:
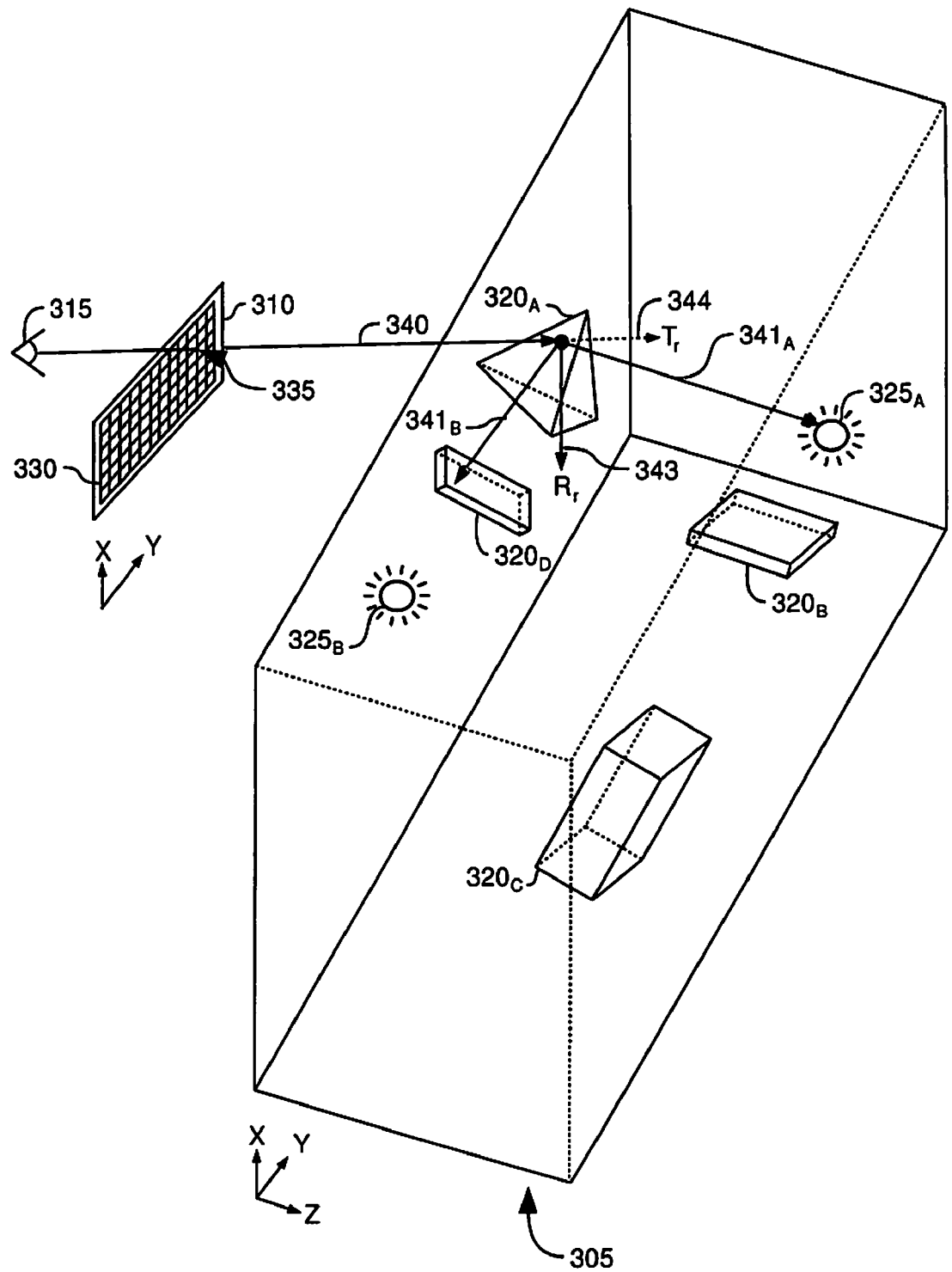
FIG. 3 is an exemplary three-dimensional scene to be rendered by an image processing system, according to one embodiment of the invention.

FIG. 3 is an exemplary three-dimensional scene 305 to be rendered by an image processing system. Within the three-dimensional scene 305 may be objects 320. The objects 320 in FIG. 3 are of different geometric shapes. Although only four objects 320 are illustrated in FIG. 3, the number of objects in a typical three-dimensional scene may be more or less. Commonly, three-dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three-dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 305 into a two-dimensional picture is called ray tracing. Ray tracing is accomplished by the image processing system "issuing" or "shooting" rays from the perspective of a viewer 315 into the three-dimensional scene 305. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. The grid 330 may be referred to as a frame. Each individual pixel may display a different color to render the final composite two-dimensional picture on the monitor 310. An image processing system using a ray tracing image processing methodology to render a two-dimensional picture from a three-dimensional scene will calculate the colors that the issued ray or rays encounters in the three-dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two-dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three-dimensional scene the ray 305 may strike objects. As the rays strike objects within the scene, the color of the object may be assigned to the pixel through which the ray passes. However, the color of the object must be determined before it is assigned to the pixel.

Many factors may contribute to the color of the object struck by the original ray 340. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within the three-dimensional scene, secondary rays may be issued from the point where the original ray 340 intersected the object. For example, shadow rays 341 may be issued to determine the contribution of light to the point where the original ray 340 intersected the object. If the object has translucent properties, the image processing system may issue a transmitted ray 344 to determine what color or light to be transmitted through the body of the object. If the object has reflective properties, the image processing system may issue a reflected ray to determine what color or light is reflected onto the object 320.

One type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g., a metal finish), then a reflected ray will be issued by the image processing system to determine what color or light may be reflected onto the object. Reflected rays traverse away from the object at an angle relative to the angle at which the original ray intersected the object. For example, reflected ray 343 may be issued by the image processing system to determine what color or light may be reflected onto the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary Kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume, then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three-dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
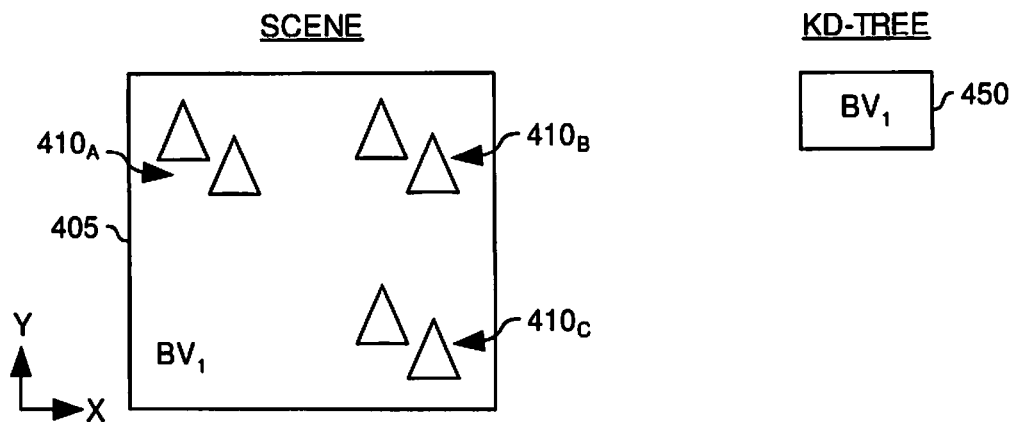
FIGS. 4A-4C illustrate a two-dimensional space to be rendered by an image processing system and a corresponding spatial index created by an image processing system, according to one embodiment of the invention.
Figure 4B:
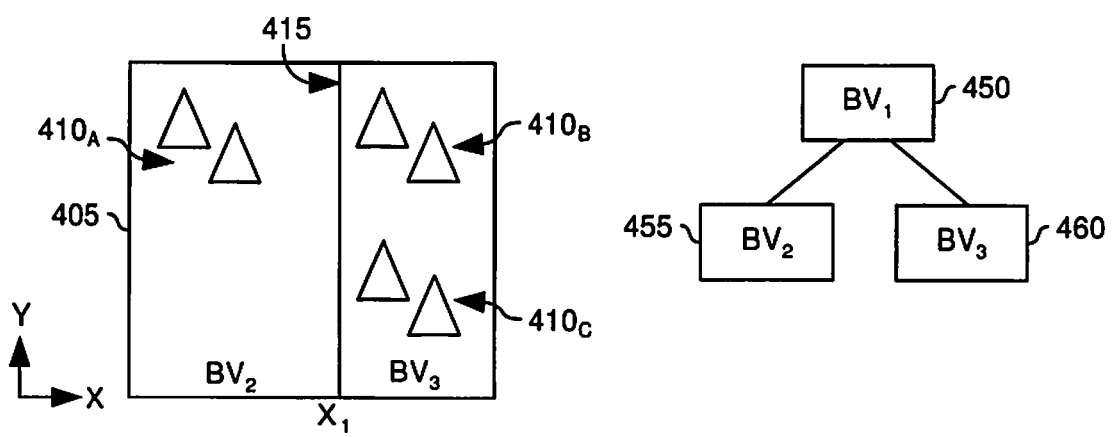
Figure 4C:
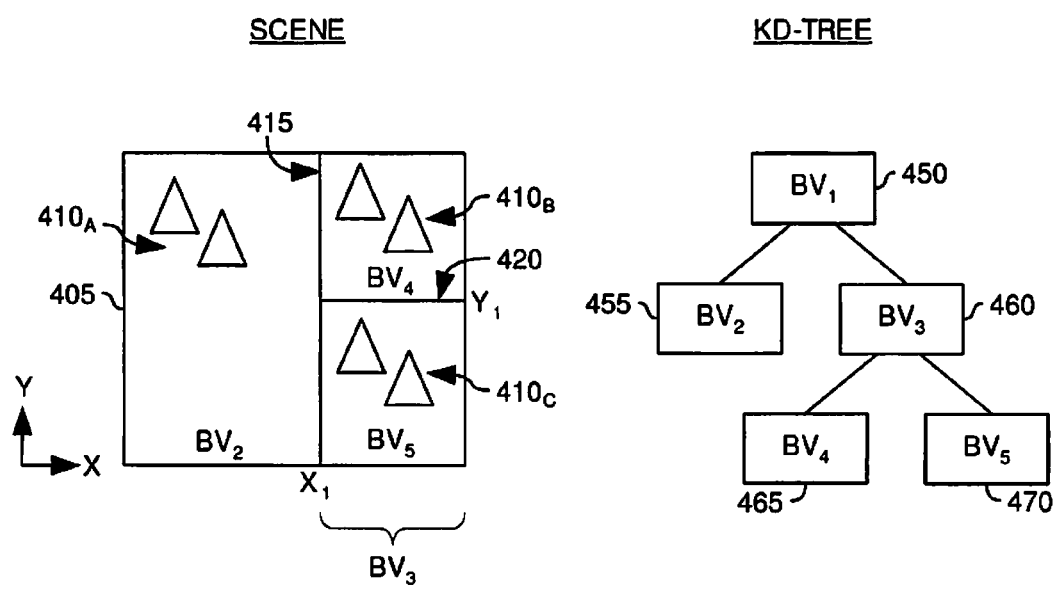

FIGS. 4A-4C illustrate a two-dimensional space to be rendered by an image processing system and a corresponding kd-tree. For simplicity, a two-dimensional scene is used to illustrate the building of a kd-Tree, however kd-Trees may also be used to represent three-dimensional scenes. In the two-dimensional illustration of FIGS. 4A-4C splitting lines are illustrated instead of splitting planes, and bounding areas are illustrated instead of bounding volumes as would be used in a three-dimensional structure. However, one skilled in the art will quickly recognize that the concepts may easily be applied to a three-dimensional scene containing objects.

FIG. 4A illustrates a two-dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two-dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$, was accomplished, by drawing a splitting plane $SP_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $410_A$). Nodes which are not partitioned or sub-divided any further, such as $BV_2$, are referred to as leaf nodes.

FIG. 4C illustrates the same two-dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane 420 along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives 410$_A$, leaf node $BV_4$ may contain pointers to primitives 410$_B$, and leaf node $BV_5$ may contain pointers to primitives 410$_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Multiple Spatial Indexes

Three-dimensional scenes may have static and dynamic objects. Static objects may be objects that do not move or change shape over a relatively long period of time (e.g., for several frames). For example, a building may be considered a static object. FIG. 5 illustrates an exemplary building 505 within a three-dimensional scene 500. The building 505 in FIG. 5 is a static object because it may not move or change shape over a relatively long period of time.

In contrast, a dynamic object may move or change shape over a relatively short period of time (e.g., over a period of a frame or two). A car may be an example of a dynamic object. For example, FIG. 5 illustrates a car 510 which may move horizontally within the three-dimensional scene 500 over a relatively short period of time.

As described previously, an image processing system may use a spatial index (e.g., a kd-tree) to render a two-dimensional image (i.e., a frame) from a three-dimensional scene. If the scene changes (e.g., objects in the scene move or change shape) the image processing system may have to change or rebuild the spatial index which represents the objects within the three-dimensional scene in order to correctly render the next two-dimensional image or frame.

If all of the objects within the three-dimensional scene are static (i.e., the do not change shape or move) from frame to frame, the spatial index does not have to be rebuilt from frame to frame. However, if the image processing system only uses a single spatial index for ray tracing and some objects within the frame move or change shape from one frame to the next, the spatial index needs to be rebuilt to correctly represent the changes in the objects which make up the scene. For example, when a dynamic object moves from a first position in a first frame to a second position in a second frame, a spatial index which represents the first position of the object in the first frame may not correctly represent the second position of the object in the second frame. Therefore, the spatial index may need to be rebuilt to correctly represent the second position of the object in the second frame.

Rebuilding the entire spatial index by the image processing system may require a considerable amount of processing cycles and thus increasing the overall amount of time required to render a two-dimensional image from a three-dimensional scene even if only a minimal portion of the three-dimensional scene changes. However, according to one embodiment of the invention, two separate spatial indexes may be built in order to reduce the amount of time necessary to respond to changes in position or shape of objects in the three-dimensional scene. By reducing the amount of time necessary to respond to changes, the amount of time necessary to render a two-dimensional image from a three-dimensional scene may be reduced as well.

Figure 6:
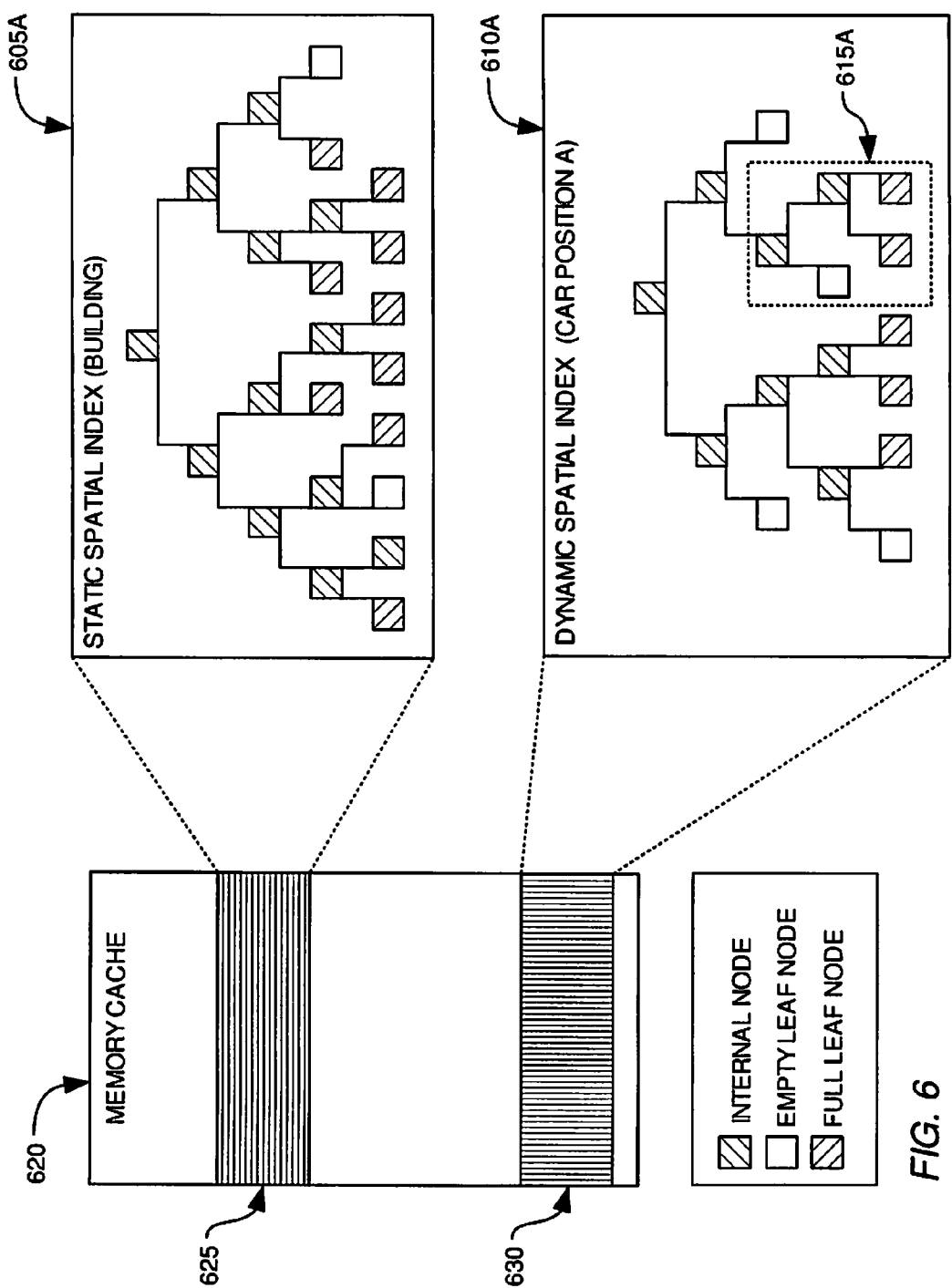
FIGS. 6 and 8 illustrate a memory cache containing a static spatial index and a dynamic spatial index, according to one embodiment of the invention.

FIG. 6 illustrates two separate spatial indexes which together may represent all objects within a three-dimensional scene, according to one embodiment of the invention. A first index may be, for example, a static spatial index 605A which may represent all of the static objects within a three-dimensional scene. A second spatial index may be, for example, a dynamic spatial index 610A which may represent dynamic objects within a three-dimensional scene, according to one embodiment of the invention.

For illustrative purposes, the three-dimensional scene to which the static spatial index corresponds may be the three-dimensional scene 500 of FIG. 5. Therefore, the static spatial index 605A may represent the static object, the building 505, in the three-dimensional scene 500 of FIG. 5. Furthermore, the dynamic spatial index 610A may correspond to the dynamic object (i.e., the car 610) in the three-dimensional scene 500 of FIG. 5.

An image processing system using a workload manager 205 to traverse a spatial index may store the spatial index in a memory cache of a processing element (e.g., the memory cache 230 of FIG. 2). Storage of a spatial index in a memory cache may expedite the traversal of a ray through the spatial index by reducing time necessary for a workload manager 205 to access data stored in the spatial index. According to one embodiment of the invention, the static spatial index 605A and the dynamic spatial index 610A may be stored in separate portions of a memory cache. By storing the static spatial index and the dynamic spatial index in separate portions of a memory cache, the dynamic spatial index may be updated without affecting the static spatial index.

FIG. 6 illustrates storing spatial indexes in separate portions of a memory cache 620. For example, the static spatial index 605A may be stored in a first portion 625 of the memory cache 620. The dynamic spatial index 610A may be stored in a second portion 630 of the spatial index.

The image processing system may be used, for example, in conjunction with other systems which control the movement of objects within the three-dimensional scene. For example, the image processing system may be used in conjunction with a physics engine in a video game system. The physics engine may move objects within the three-dimensional scene and the image processing system may render multiple images or frames per second which illustrate the new or moved positions of the objects within the scene. Thus the image processing system and the physics engine may together provide animation.

The image processing system may determine that it is time to update the static spatial index, for example, if objects which were once considered static objects move or change shape and hence need to be considered dynamic objects rather than static objects. Furthermore, it may be time to update the static spatial index, for example, if objects which were once dynamic are no longer moving or changing shape and now may be considered static objects. Although at times the image processing system may determine that the static spatial index may need to be updated, the frequency of this determination may be lower than the frequency of the need to update the dynamic spatial index. For example, a new dynamic spatial index may need to be created from frame to frame whereas a static spatial index may only need to be updated after sixty frames have passed.

Figure 7:
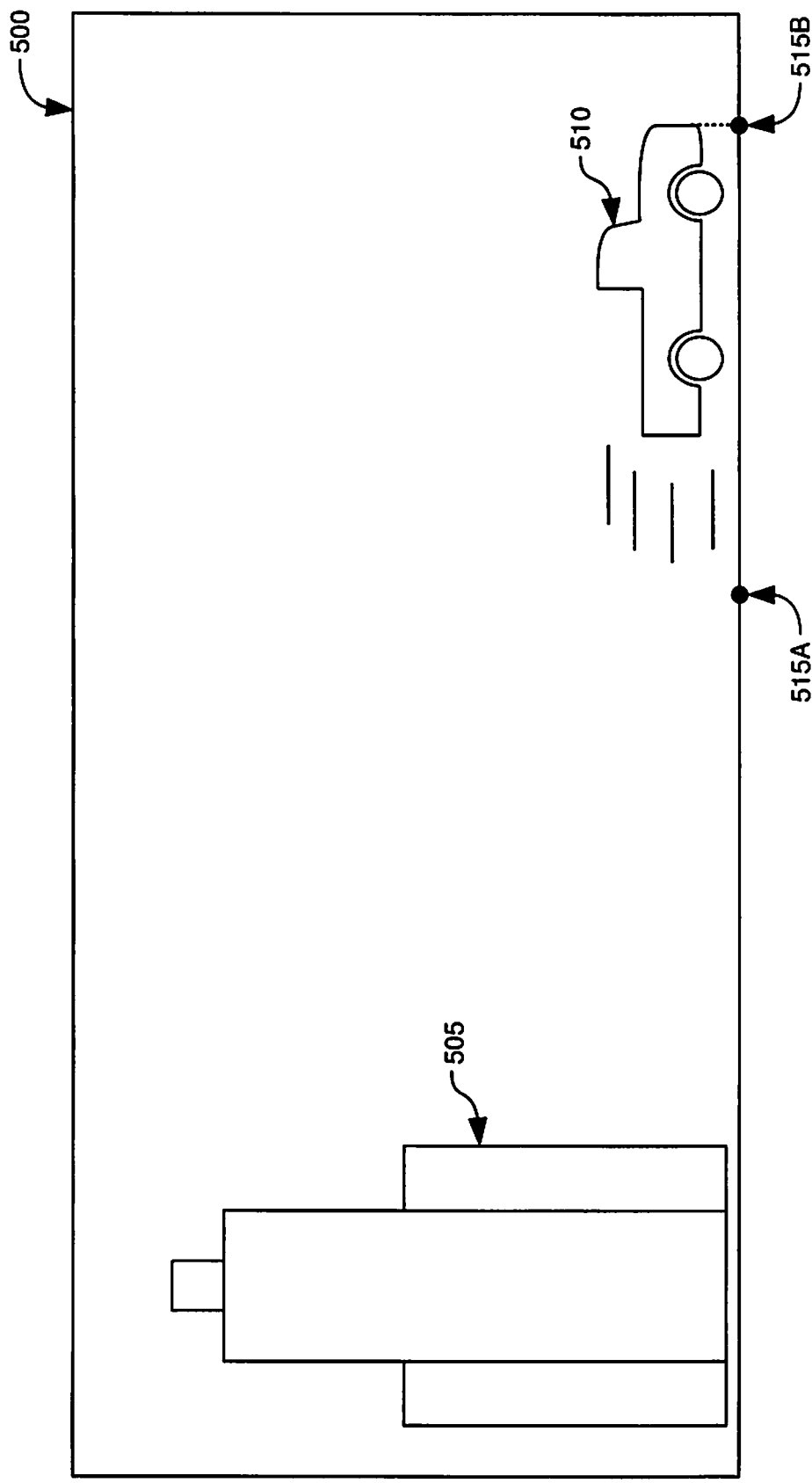

For example, FIG. 7 illustrates the three-dimensional scene 500 which was also illustrated in FIG. 5. However, the dynamic object in the three-dimensional scene 500 (i.e., the car 510) has moved from a first position 515A in the three-dimensional scene 500 to a new position 515B. However, the static object (i.e., the building 505) has remained in the same position. Consequently, in order to properly represent the new three-dimensional scene 500 a new dynamic spatial index may be created by the image processing system, according to embodiments of the invention. The new dynamic spatial index may reflect the movement of the dynamic object(s) within the scene (i.e., the car 510). In contrast, according to embodiments of the intervention, since the static objects have not changed position in the three-dimensional scene 500, the static spatial index which was created to represent to the static objects present in FIG. 5 correctly represents the static objects present in FIG. 8.

Therefore, instead of rebuilding a single spatial index which represents all objects (i.e., static and dynamic) within the entire three-dimensional scene in response to movement of the dynamic objects within the scene, only the dynamic spatial index must be rebuilt to correspond to the movement of objects within the three-dimensional scene. Rebuilding a spatial index which only represents a portion of the objects within the three-dimensional scene (i.e., the dynamic spatial index) may require less time in contrast to rebuilding a spatial index which represents all of the objects (i.e., dynamic and static).

After the image processing system has created a new dynamic spatial index 610B, the image processing system may store the new dynamic spatial index 610B in the dynamic spatial index portion 630 of the memory cache 620.

Figure 8:
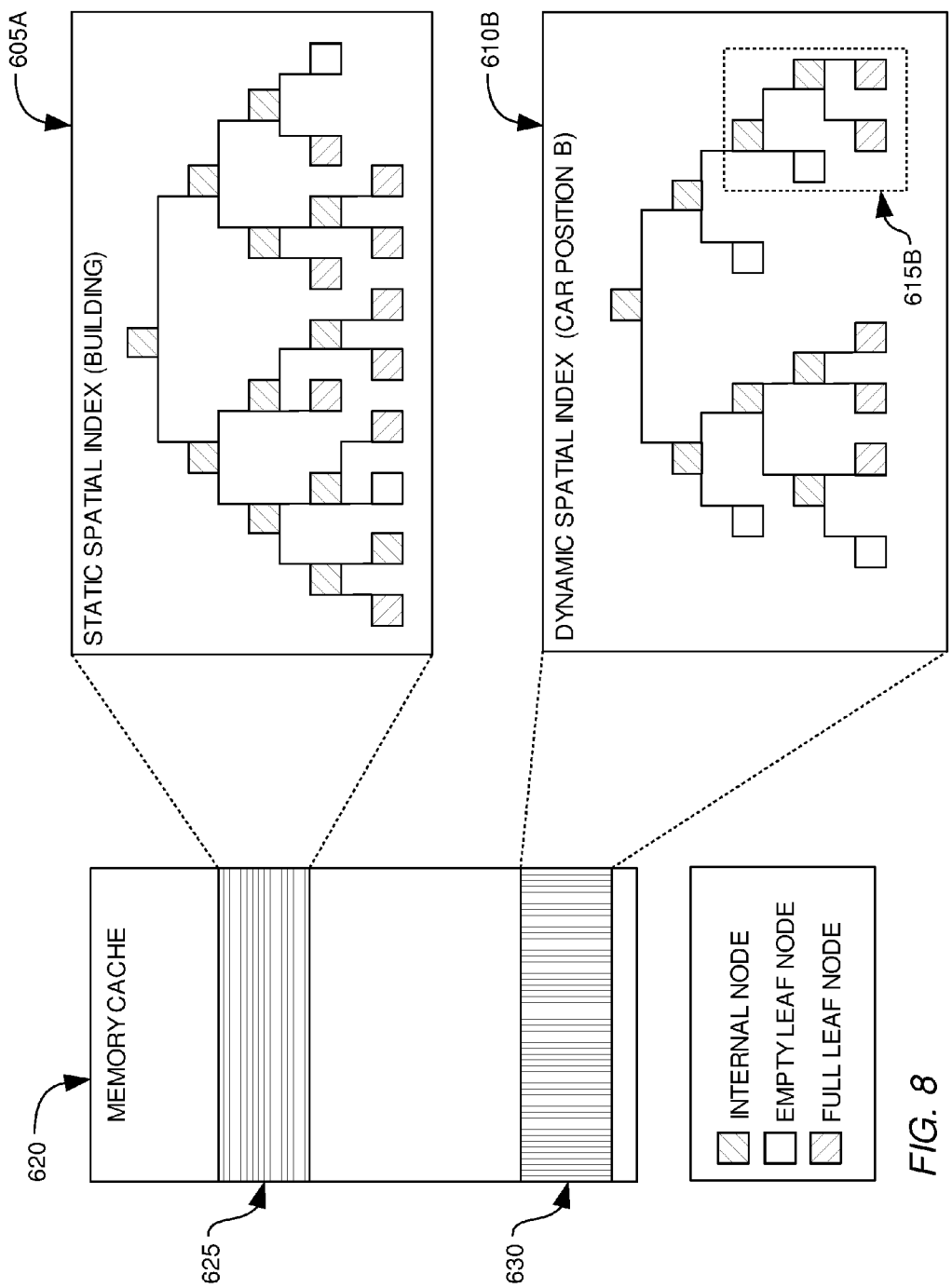
Figure 9:
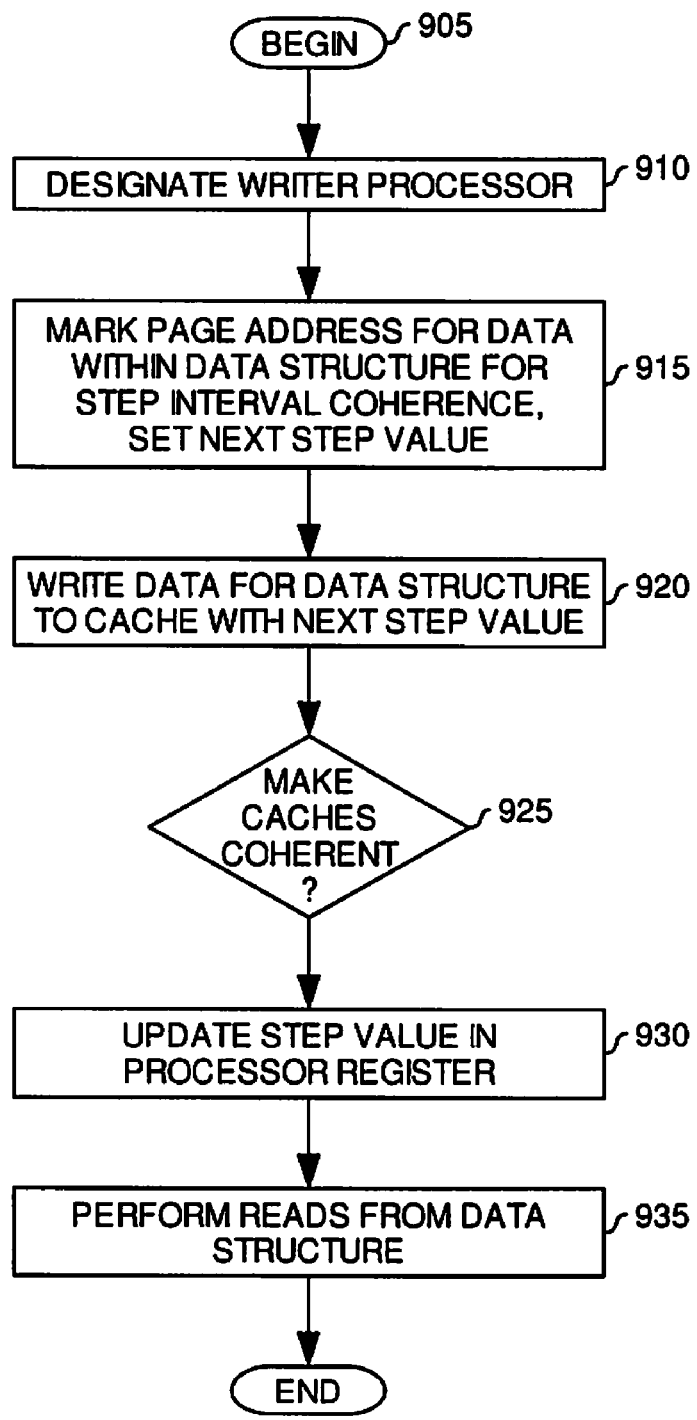
FIG. 9 is a flowchart illustrating an exemplary method of writing data to cache memory along with a step value, according to one embodiment of the invention.

FIG. 8 illustrates the memory cache 620 which was used to store the dynamic and spatial indexes which represented FIG. 5. However, the image processing system has since replaced the dynamic spatial index corresponding to the old position or shape of objects within the three-dimensional scene with a new dynamic spatial index. For example, a new dynamic spatial index 610B which may represent the new position 515B of the car 510. The new dynamic spatial index 610B may differ only slightly from the dynamic spatial index 610A which represented the initial position 515A of the car 510. As illustrated in FIG. 9, the difference between the old dynamic spatial index and the new dynamic spatial index is a portion 615B of the dynamic spatial index 610B, which may correspond to the portion 615A in dynamic spatial index 610A. This portion 615B of the dynamic spatial index may correspond to the change in position of the car 510B from the first position 515A to the second position 515B.

Also illustrated in FIG. 8 is the static spatial index 605A. The static spatial index 605A has not changed from FIG. 6 to FIG. 8 because the static object (i.e., the building 505) has not changed position or shape in the three-dimensional scene 500.

Cache Invalidation with Data Dependent Expiration Using a Step Value

According to embodiments of the invention a memory cache may contain multiple data structures each of which may be updated or invalidated at various times. For example, as described above, a memory cache in an image processing system may contain both a dynamic spatial index and a static spatial index. Furthermore, the memory cache may have a dynamic portion where the dynamic spatial index is stored and a static portion where the static spatial index is stored. In some circumstances, it may be desirable to store the dynamic spatial index and static spatial index separately such that the portion of memory which stores the dynamic spatial index may be periodically invalidated while keeping the static portion of the memory cache valid.

Periodic invalidation of the dynamic portion of the spatial index may be performed in anticipation that a new dynamic spatial index corresponding to new positions of objects (e.g., due to movement or collision) within the three-dimensional scene may be used by the image processing system. By periodically invalidating the dynamic portion of the spatial index, the risk of a processing element using invalid data is reduced.

Invalidation of a data structure (e.g., the dynamic spatial index) in a memory cache may require an application to issue a large number of cache invalidate instructions in order to invalidate each line of the cache which contains data related to the data structure. The large number of invalidate instructions may consume a large amount of processing bandwidth and power.

In some circumstances a data structure (e.g., the dynamic spatial index) may be stored within the cache memory of multiple processing elements in a multiple processor environment. For example, the dynamic spatial index may be stored within the L1 memory cache 112 of each of the processing cores 110 in the multiple core processor 102 illustrated in FIG. 1.

Cache coherency may be necessary in a multiple processing core system when the caches of the various processor cores may contain data which relates to the same main memory address. Cache coherency may enable the system to avoid situations where different versions of data corresponding to a main memory address are located within separate memory caches and one processor might use an old or invalid version of the data. For example, one processor may update the a portion of the dynamic spatial index within its own cache while another processor may contain old data corresponding to the same portion of the dynamic spatial index within its cache and attempts to use the old data.

In some circumstances, cache coherency may be maintained by hardware and accomplished, for example, using a snooping bus protocol (e.g., MESI protocol). Using a snooping bus protocol, each processor cache may monitor bus transactions for writes to memory at an address location which contains data present within the processor's cache. Although snooping bus protocols may effectively maintain cache coherency, when a periodic data structure (e.g., dynamic spatial index) is frequently invalidated many bus transactions may be generated each time new data relating to the data structure is written to a processor cache. Thus, periodic invalidation of a data structure contained within a plurality of processor caches using a standard cache coherency protocol (e.g., MESI protocol) may result in the consumption of a large amount of processing bandwidth and power.

However, according to embodiments of the invention, portions of a memory cache may be periodically updated and the number of bus transactions relating to updating the data structure minimized, by associating step values with data which forms the data structure and by using and a modified cache coherency protocol. The modified cache coherency protocol may be referred to as a step-interval cache coherency protocol.

Using the step value in conjunction with the step-interval cache coherency protocol to update portions of the memory cache eliminates the need to perform thousands if not millions of cache invalidate instructions when a data structure needs to be invalidated. The elimination of the need to perform these invalidate instructions, may allow a processing element (or elements) to perform other tasks (e.g., image processing tasks) and, consequently, may improve the performance of the system (e.g., a ray-tracing image processing system).

According to embodiments of the invention, step values may be associated or stored with data stored within cache memory. Step values may be, for example, an integer value and may be used to determine if the associated data which resides within a memory cache is current by comparing a stored step value with a current step value. Additionally, the current step value may be altered (e.g., incremented) to invalidate data which is associated or stored with an old step value. The step value may be associated with data which forms a portion of a data structure (e.g., the dynamic spatial index or the static spatial index).

According to embodiments of the invention, in conjunction with the normal address tag and state comparison in the cache, the current step value and the step value associated with data within the cache may be compared. The current step value may be specified in a register within the memory cache, and the step value associated with data within the cache may be located within the cache directory containing the valid bits and address tag associated with the data within the memory cache. If the current step value and the step value associated with data match, a cache hit occurs and the data stored within the cache memory associated with the address may be returned to the processor. However, if the current step value and a step value associated with the data do not match, a cache miss occurs and the data must be retrieved from another source. By associating a step value with data within the data structure and using the step value during the cache compare, the cache may quickly determine if data within the cache is current. In addition, by modifying (e.g., updating) the current step value, an application may quickly invalidate all data stored within cache memory which is associated with an old step value or values without needing to issue invalidate instructions.

Furthermore, according to embodiments of the invention, the step-interval cache coherency protocol may be used to control when data associated with a new version of a data structure is shared with other processors and, thus, written to other cache memory. The step-interval cache coherency protocol may be used in conjunction with the step values in order to periodically update a data structure within the cache memory. An application may use the step-interval cache coherency protocol to write an entire data structure to cache memory before the data structure is to be used by other processors. For example, the image processing system may use the step-interval cache coherency protocol to write a new version of a dynamic spatial index (corresponding to a future frame) to the cache before the dynamic spatial index is to be used by the image processing system to render the frame.

According to embodiments of the invention, when a miss occurs on a write to the cache memory, under the step-interval cache coherency protocol the logic within the cache memory may store the data from the write locally, but may not allow coherency between the writer processor cache and other caches. By not allowing coherency on a cache miss caused by a write to the cache memory, the step-interval cache coherency protocol may prevent the other caches from snooping the data which was written to the cache. However, on cache misses due to a read request, the step-interval cache coherency protocol may allow coherency between caches. By allowing cache coherency on a read miss, the step-interval cache coherency protocol may allow data for a new version of the data structure to be retrieved from other sources (e.g., cache memory for other processors, main memory, etc.).

FIG. 9 is a flowchart which illustrates an exemplary method 900 of writing data to a memory cache and associating a step value with the data, according to embodiments of the invention. The method begins at step 905, for example, when an application or a system determines a data structure needs to be stored in cache memory. For example, the image processing system may determine a need for a dynamic spatial index to be stored in cache memory in order to perform image processing.

Next at step 910, according to one embodiment of the invention the application may designate a writing processing element. The writing processing element may perform all of the writes of data associated with the data structure which is to be used by the application. The writing processing element may write the data into its cache memory (e.g., L1 cache memory).

Figure 10:
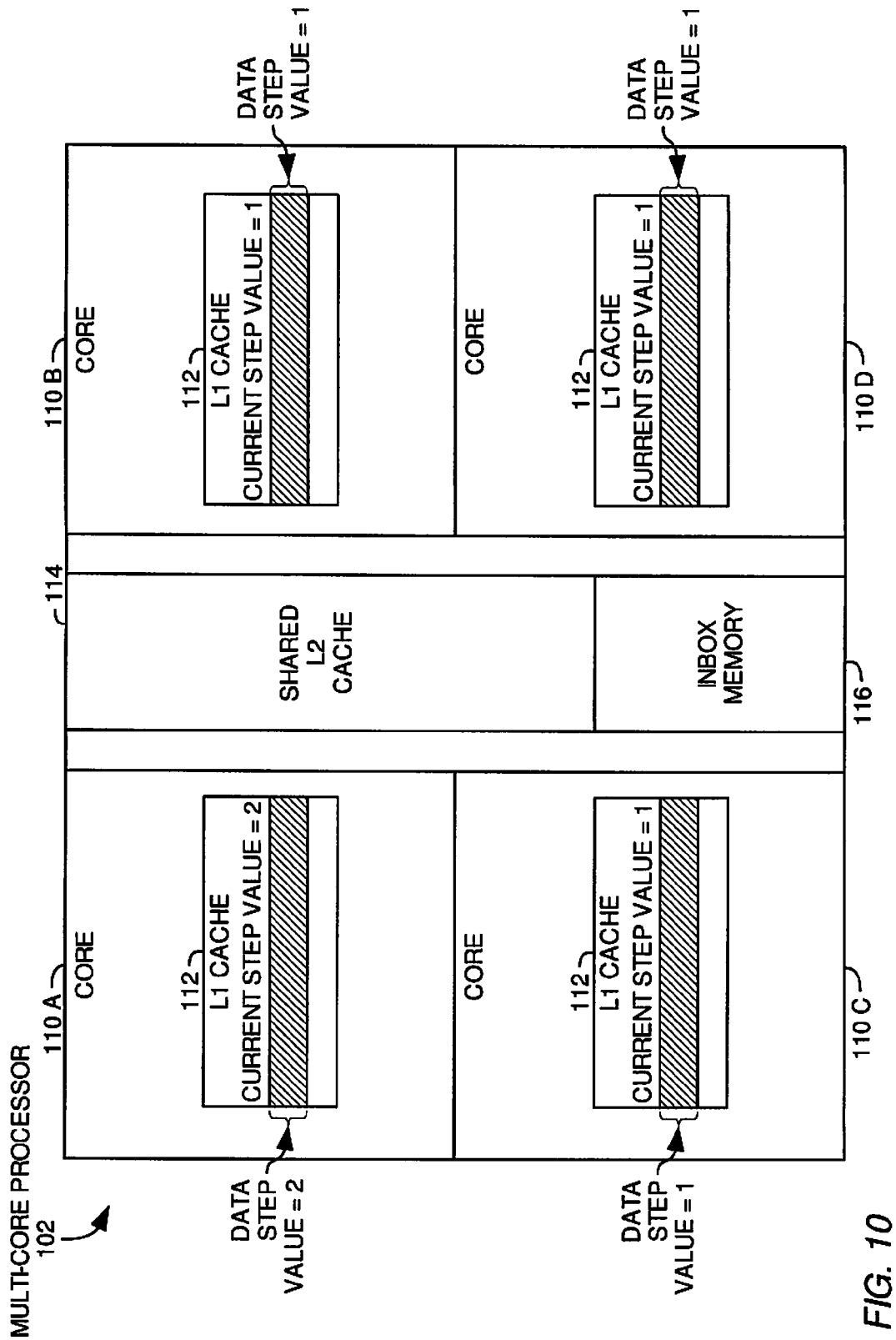
FIGS. 10 and 12 illustrate an exemplary multiple core processor, according to one embodiment of the invention.

For example, FIG. 10 illustrates an exemplary multiple core processor 102 containing four processor cores (110A-110D). As illustrated, each processor core 110 contains cache memory (i.e., an L1 cache 112). One core processor 110A may be designated as the writing processor core by an application (e.g., the image processing system) and may write data corresponding to the data structure to its cache memory (e.g., L1 cache 112). As explained further below and illustrated in FIG. 10, the writer processor core 110A may have a current step value of 2 within its memory cache, while reader processor cores (110B-110D) may have a current step value of 1 within their memory caches.

Although embodiments are described herein as using a single processing element or processor core to write data which corresponds to the data structure, other embodiments of the invention are envisioned which may use a plurality of processing elements to write data corresponding to the data structure to a plurality of memory caches.

Next, at step 915 the application may mark the page address range for a data structure which is to be written into the data cache by the writer processor to indicate the step-interval cache coherency protocol is to be used. As described below, this may be accomplished by updating data coherence mode bits associated with an address range for the data structure which is to be written to the data cache.

According to embodiments of the invention, a periodic data structure or a group of data structures may be identified by an address range. The address range may be specified, for example, within the memory management unit (MMU) logic of the processor. Alternatively, a register may be added to the processor which specifies an address range for the data structure. According to one embodiment of the invention, the address range register may be located within a cache controller of the cache memory.

Figure 11:
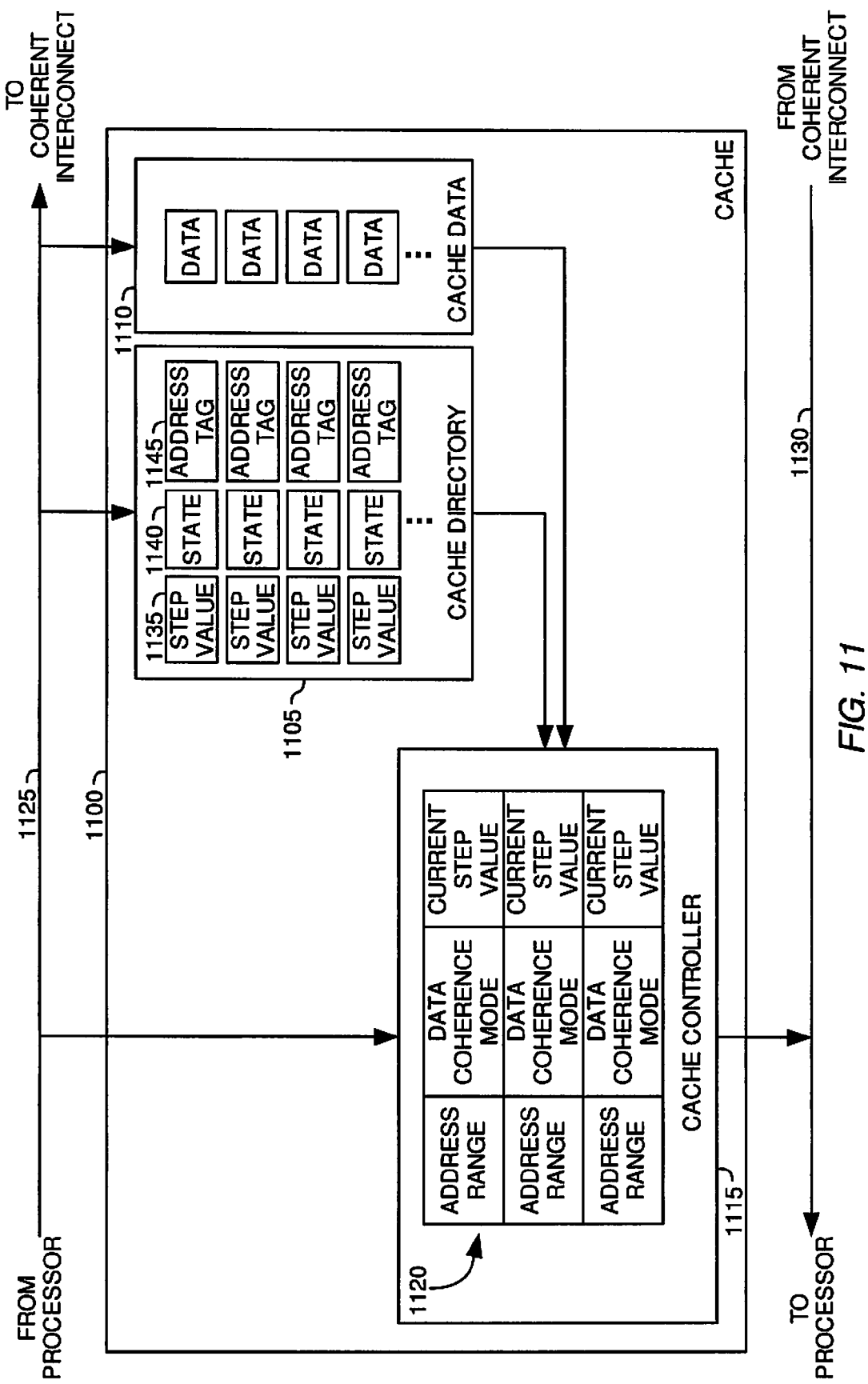
FIG. 11 illustrates an exemplary cache memory, according to one embodiment of the invention.

FIG. 11 illustrates an exemplary cache memory 1100 containing a cache directory 1105, cache data store 1110, and a cache controller 1115. As illustrated in FIG. 11, the cache controller 1115 may contain registers 1120 which may contain address ranges for a plurality of data structures. The data cache may be, for example, an L1 cache 112 of a processor core 110 illustrated in FIG. 1. A first bus 1125 and a second bus 1130 are also illustrated in FIG. 11. The first bus 1125 and the second bus 1130 may connect the processor with the cache memory 1100 and with other processing cores and memory caches.

As illustrated a plurality of address ranges may be specified by a plurality of registers within the cache controller 1120. According to embodiments of the invention, each address range specified by an address range register may correspond to a single data structure or a group of data structures which may be defined by a plurality of rows within the cache data store. By identifying various data structures through the use of a separate address range registers within the cache controller, the various data structures may be invalidated at different times. Furthermore, by associating a step value with an address range which corresponds to a data structure or a group of data structures, an entire data structure or group of data structures may be invalidated by updating the current step value associated with an address range as will be further described below. Similarly, if the address ranges for various data structures are defined within the MMU logic of a processor, distinct step values may be associated with the address ranges within the MMU logic.

For example, the dynamic spatial index may be associated with a first address range register while the static spatial index may be associated with a second address range specified by a second address range register. Consequently, the dynamic spatial index may be invalidated by updating the current step value associated with the first address range in the cache controller 1115, while the static spatial index may remain current by not modifying the current step value associated with the second address range in the cache controller.

Associated with each address range may be several attribute bits. These bits may be used by the processor or logic within the data cache to determine how to handle reads from and writes to portions of a periodic data structure within the corresponding address range. A first attribute bit or set of attribute bits may be a data coherence mode bit or bits. The data coherence mode bits may specify if real time cache coherence or step interval cache coherence is to be used when reading data from or writing data to the periodic data structure. Real time coherence may be accomplished using a commonly known cache coherency protocol (e.g., MESI cache coherency protocol). In contrast, step interval cache coherence may be used as described above and according to embodiments of the invention.

A second bit or set of bits may be used to specify a step value for the data. The step value associated with data within the memory cache may be used along with a current step value to determine if the data is current. The step value associated with the data within the data cache may be thought of as a version of the data within the data cache.

For example, as illustrated in FIG. 11, the registers 1120 located within the cache controller 1115 of the cache memory 1100 may contain a data coherence mode bit or a set of data coherence mode bits and a current step value bit or a set of current step value bits. Thus, the application may mark the page address for the data structure for step-interval coherence at step 915, for example, by updating the cache coherence mode bits in a cache-controller register which corresponds to the address range for the data structure.

In addition to updating the coherency mode bits for the address range corresponding to the data structure, at step 915 the application may also update a step value (current step value) which is to be associated with the data which is written into the data cache. This updated step value which may written with the data may be used to identify a new version of the data and, consequently, a new version of the data structure which is to be written into the cache memory by the processor. The application may set the step value for the data structure, for example, by updating the step value bits in a cache-controller register which corresponds to the address range for the data structure.

For example, the image processing system may currently be using a first version of the dynamic spatial index to perform image processing. However, in anticipation of performing image processing for a future frame, the image processing system may use a writer processor to write a future version of the dynamic spatial index into the data cache. The first version of the dynamic spatial index may be stored within the memory cache of reader processors, and the cache directory lines or entries corresponding to the data within the first version of the dynamic spatial index may have step values equal to 1. In order to indicate the data which is to be written to the memory cache of the writer processor corresponds to the next version of the dynamic spatial index, the image processing system may update the current step value in the cache controller of the writer processor. Consequently, a step value of 2 may be written into the cache directory lines of data which makes up the new version of the dynamic spatial index as the writer processor writes the data into the cache memory.

For example, as illustrated in FIG. 10, the writer processor core 110A may have a current step value of 2 within its memory cache, while reader processor cores (110B-110D) may have a current step value of 1 and a step value of 1 within the cache directory entries associated with data within the reader processor memory caches.

Next, at step 920, the application may write the data for the data structure into the data cache. As data for the data structure is written into the data cache, the current step value on the writer processor may be written into cache directory entries within the cache directory. Although various configurations of cache directory entries may be used, along with the current step value a cache directory entry may also include state bits (e.g., valid bit) and bits which identify the data (e.g., an address tag) stored within the cache data store according to one embodiment of the invention.

For example, as illustrated in FIG. 11 each cache directory entry may be defined by or contain a step value 1135, a state 1140, and an address tag 1145. Each cache directory entry may correspond to a data entry within the cache data store 1110 of the cache memory 1100. Furthermore, as illustrated in FIG. 10, the current step value of 2 may be associated with data (e.g., written to cache directory entries) written to the cache memory (L1 cache 112) of the writer processor core 110A. Although the cache directory entries are illustrated in FIG. 11 as having address tag bits, it should be understood that embodiments of the invention may be applied to any cache configuration including fully associative caches and set associative caches.

As the data is written to the memory cache of the writer processor, a cache miss may occur if the step value being written to the data cache does not match the step value within the cache directory entry (local step value). According to embodiments of the invention, when using the step-interval cache coherency protocol cache misses on writes to the cache of the writer processor will cause a bus transaction of read (i.e., cacheable, but non-coherent). The cacheable but non-coherent status of the cache miss on a write will allow the writer processor to write the new data structure to the data cache and prevent other caches from snooping the write to the cache (i.e., accessing the data written into the cache). By treating misses on writes as reads, a processor may write an entire new data structure to the data cache before the data structure is to be used by other data caches. Thus, the new data structure may be written in its entirety and present within the cache when the applications needs to use the new data structure (e.g., the next frame of image processing).

After the application is finished writing data for the data structure into the cache, at step 925 the application may make the data within the writer processor cache coherent across all caches. The time to make the data structures coherent may be determined by the period which a new data structure is required by the application.

For example, an application such as an image processing system may require a new dynamic spatial index for each new frame to be rendered. An image processing system may render a new frame once every $60^{th}$ of a second. Therefore, after writing new data into a data cache corresponding to a new dynamic spatial index, the image processing system may determine once every $60^{th}$ of a second to make the other caches coherent with the cache containing the new or updated dynamic spatial index.

According to embodiments of the invention, the application may make the caches coherent using one of several techniques. First, the application may make the data within the caches coherent by flushing all of the data which corresponded to the data structure from cache memory of the writer processor back to memory. This may be accomplished, for example, by issuing a cache flush instruction for each line of the cache structure that contains updated data (e.g., each line which pertains to the new version of the data structure) such that cache sends the updated data entry or entries to a globally visible memory location or locations (e.g., shared L2 cache 114, main memory, etc.). Alternatively, the application may make the caches coherent by initiating a hardware engine flush to send lines in the cache back to globally visible memory. According to embodiments of the invention, the hardware engine flush may send all of the lines in the cache back to main memory, may send only the lines which contain data relating to the updated data structure, or send only the lines which only contain modified data.

However, as described below with respect to FIG. 13, the application may make all caches coherent by not doing anything at step 925. Rather, the application may rely on the step-interval cache coherency protocol to make the caches coherent by responding to cache misses in the reader caches.

Next, at step 930, the application may update a current step value within a register which resides in each processor which may use the data structure (i.e., reader processor). The processor may update the current step value within each cache memory by sending messages from the writer processor or thread to threads on the reader processors. The application may update the step value to correspond to the step value which was used when writing data corresponding to a new data structure into cache memory of a writer processor.

Figure 12:
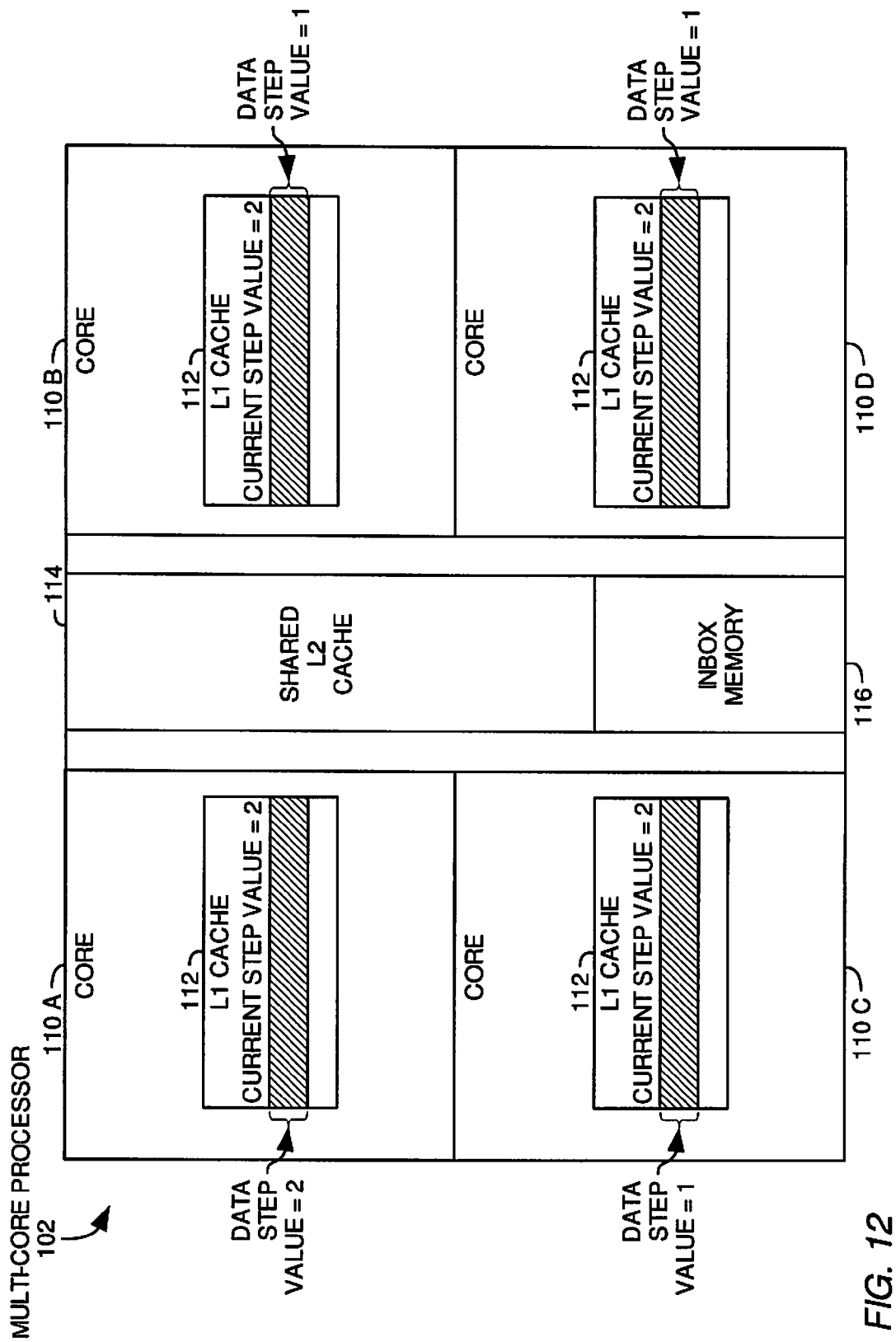

For example, if at step 915 the application wrote data to the data cache of the writing processor with a step value of 2, then at step 925 the application may update the current step value in each processor which may use the data structure to a value of 2. FIG. 12 illustrates the current step value stored within the memory cache of each reader processor (110B-110D) updated from a value of 1 to a value of 2.

By updating the step value in the register of all processors which may use data within the data structure, the application effectively invalidates all data within processor caches (e.g., reader processor caches) which is associated with a non-matching step value. The data may be effectively invalidated, because when the cache controller compares the current step value (e.g., 2) with an old step value associated with data within the cache directory (e.g., 1), the values will not match and the cache controller may consider the comparison a miss.

Next, at step 935, the application may perform or issue reads in processors to addresses within the address range of the data structure. An exemplary method of performing reads using the step value and the real-time coherency protocol is described further below with respect to FIG. 13.

Figure 13:
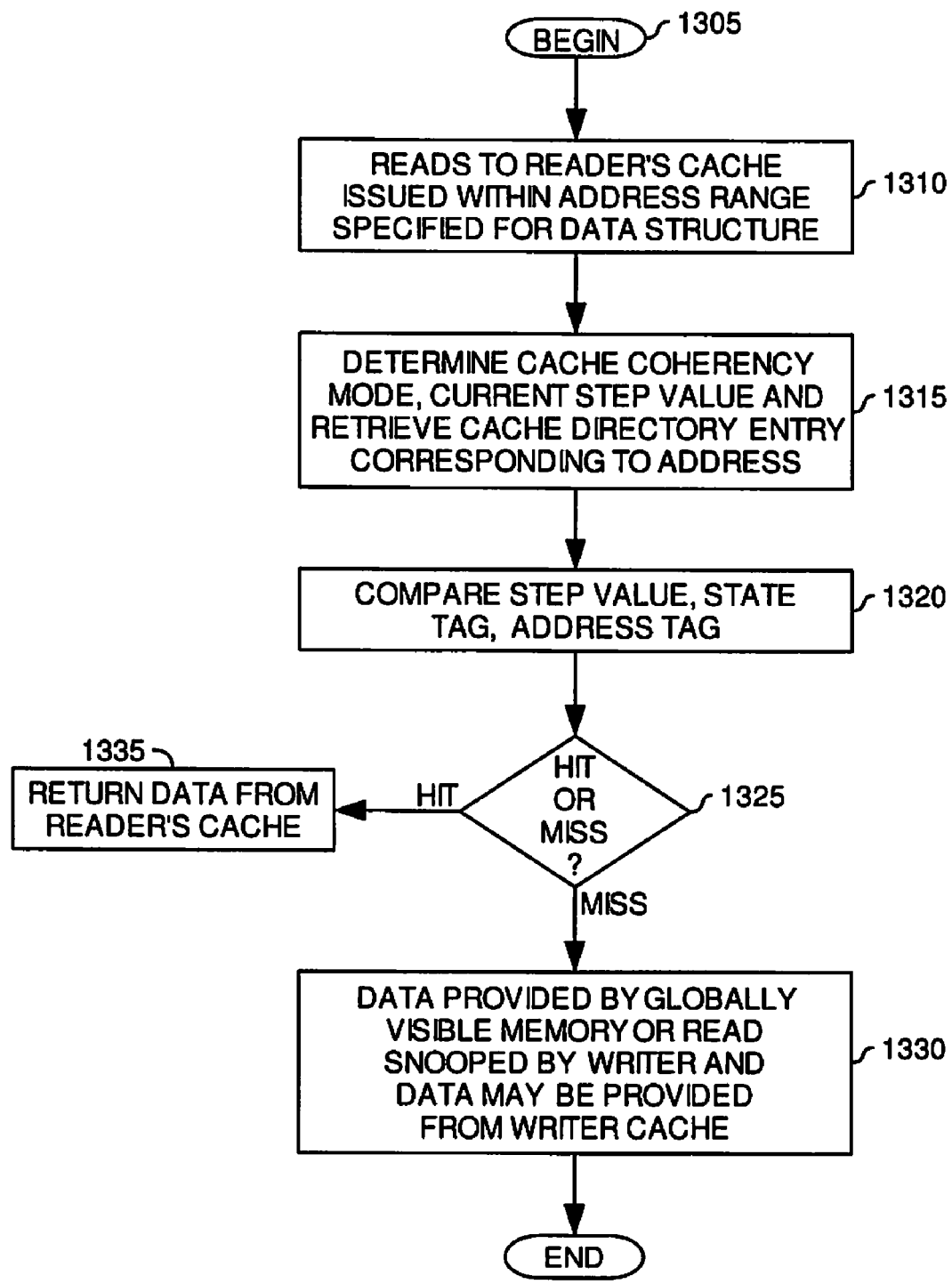
FIG. 13 is a flowchart illustrating an exemplary method of reading data from cache memory, according to one embodiment of the invention.

FIG. 13 is a flowchart illustrating an exemplary method 1300 of performing reads from a data cache using a step value and the step-interval cache coherency protocol, according to embodiments of the invention. The method 1300 begins at step 1305 when a processing element places an address on a bus in response to an instruction which requires data from memory (e.g., load instruction). The address placed on the bus may be used by the memory cache to determine if data corresponding to the address is stored within the memory cache.

Once the cache receives the address from the processor, at step 1310 the cache controller may compare the address to an address range register within the cache controller to determine if the address is within an address range corresponding to a data structure. If so, at step 1315, the cache controller may retrieve the data coherence mode, the data group ID and the current step value associated with the data structure specified by the register. The data coherence mode may indicate that the step-interval cache coherency protocol is to be used and the current step value may be the current step value updated by the writer processing element in step 930 of method 900. By saving the attribute bits within the cache controller, no modification to the read instruction or instruction logic is necessary.

Once the cache controller retrieves the attribute bits related to the address for the data structure, the cache controller may compare various information to determine if current data related to the address of the instruction is located within the memory cache. According to one embodiment of the invention, in addition to a comparison of the address provided by the processor and the address tag within the cache directory, the cache controller may also examine or compare the state bits of a matching cache directory entry with a known good state to determine if the data within the cache which corresponds to the cache directory entry is valid. Furthermore, according to embodiments of the invention, at step 1320 the cache controller may compare the step value bits retrieved from the cache directory entry with the current step value bits retrieved from the register within the cache controller. The comparison of the step value bits which are stored within the cache directory entry with the current step value bits retrieved from the register may indicate whether or not the data within the cache is current.

Next at step 1325, the cache controller may determine if a cache hit or a cache miss occurs. The cache hit or miss determination may be based on the results of the comparison of the address values, the state tags, and the step values associated with the data located at the address requested by the processor. If any of the compared bits do not match or the data is invalid a cache miss occurs and the cache controller proceed to step 1330. However, if the current state bits match, the data is valid, and the address tag matches, a cache hit occurs and the cache controller may proceed to step 1335.

After a cache hit, at step 1335, the cache controller may provide data from the data cache to the processor via a bus. In contrast, if a cache miss occurs, at step 1330, data may be provided to the processor from another source. For example, according to one embodiment of the invention, when using the step-interval cache coherency protocol, when a cache miss due to a read request occurs, data may be provided from the cache of the writer processor to the processor which requested the data. Subsequently, the data provided by the writer processor may be written into the data cache of the requesting processor and a corresponding cache directory may be created containing the current step value. Consequently, the data structure may be updated as needed by the cache of the writing processor.

Alternatively, according to another embodiment of the invention, when a cache miss due to a read request occurs, data may be provided to the requesting processor from globally visible memory (e.g., the shared L2 cache or main memory). The requested data may be present in the globally visible memory, for example, due to a cache flush executed in step 925 of method 900. As the data is provided from a globally visible memory, the data may be written into the data cache of the requesting processor along with the current step value.

Although the step value may sufficiently invalidate data within the memory cache from one increment of the step value to the next, a problem may exist if the number of step values is finite and at some point the application reuses step values. If the application reuses the step values, in some circumstances an old data cache entry associated with an old step value may remain within the cache until the application reuses the old step value. Consequently, a cache hit may occur when the application reuses the old step value and invalid data may be returned to the requesting processor.

However, according to embodiments of the invention, a scrubber may be used to invalidate the old data within the memory cache. The scrubber may be a hardware unit or a software routine which invalidates old cache lines within the cache which are associated with old step values.

According to one embodiment of the invention, the scrubber function may read each cache line within the cache directory and check the step value associated with each cache directory entry. Upon encountering a cache directory entry containing a step value which does not match the current step value, the scrubber function may invalidate the corresponding memory cache entry by setting the valid bit of the cache directory entry, for example, to '0'. Consequently, any attempted access to the cache entry that has been invalidated by the scrubber function will cause a cache miss. Thus, by invalidating the cache directory entries which contain old step values, the scrubber function may ensure that old data within the memory cache is not accessed in the future.

The rate at which the scrubber function reads the rows within the cache directory may be programmable, and may be adjusted such that the scrubber may examine and invalidate all cache directory entries before a step value is reused by the application. Consequently, if the application uses many step values the scrubber function may operate more slowly than if the application uses very few step values.

Although the embodiments of the invention for updating and invalidating memory cache are herein described with reference to a portion of a memory cache which contains a dynamic spatial index, it should be understood that the invention is not limited to invalidating cache memory areas which only contain dynamic spatial indexes. Instead, any portion of a memory cache containing any type of data, whether related to image processing or not, may be invalidated by the methods and apparatus described herein.

Furthermore, although the current step value is herein described as being stored within the cache controller of a memory cache, the examples given above are for purposes of description and the invention is not limited to specific described embodiments. Embodiments of the invention are envisioned in which the current step value may be stored elsewhere within a processor core.

CONCLUSION

According to embodiments of the invention, a step value and a step-interval cache coherency protocol may be used to update and invalidate data stored within cache memory. According to embodiments of the invention, a step value may be stored within a cache directory entry associated with data in the memory cache. Upon reception of a cache read request, along with the normal address comparison to determine if the data is located within the cache a current step value may be compared with the stored step value to determine if the data is current. If the step values match, the data may be current and a cache hit may occur. However, if the step values do not match, the requested data may be provided from another source. According to embodiments of the invention, an application may update the current step value effectively invalidating old data stored within the cache and associated with a different step value. By updating the current step value to invalidate data stored within the cache memory, embodiments of the invention eliminate the need to perform many cache invalidate instructions.

While the foregoing is directed to embodiments of the present invention, other and further embodiments of the invention may be devised without departing from the basic scope thereof, and the scope thereof is determined by the claims that follow.

What is claimed is:

1. A method of managing data in a memory cache, the method comprising:
setting a first current step value representing a first dynamic spatial index for the three-dimensional scene at a first point in time, the first dynamic spatial index being stored in a first address range of the memory cache, the memory cache further storing a static spatial index for the three-dimensional scene in a second address range of the memory cache;

creating a cache directory entry having a local step value in a cache directory within the memory cache, wherein the cache directory entry corresponds to data within the memory cache, wherein the data represents the first dynamic spatial index, wherein the local step value represents at least one of: (i) the first dynamic spatial index and (ii) a second dynamic spatial index for the three-dimensional scene at a second point in time prior to the first point in time;

receiving a request to retrieve data at an address corresponding to the cache directory entry;

comparing at least the local step value with the first current step value to determine if at least one of a cache hit or a cache miss occurs; and upon determining that a cache miss occurs, invalidating the second dynamic spatial index without invalidating the static spatial index.

2. The method of claim 1, wherein the memory cache corresponds to a first processing element; and wherein the method further comprises:

providing a second current step value within a second memory cache, wherein the second memory cache corresponds to a second processing element;

providing a cache directory entry within a second memory cache containing at least a second local step value and corresponds to data within the second memory cache;

receiving a request for data at an address corresponding to the cache directory entry within the second memory cache; and determining a cache miss occurs within the second memory cache by comparing at least the second local step value of the cache directory entry within the second memory cache with the second current step value.

3. The method of claim 2, further comprising:

flushing data within the memory cache associated with the first processing element back to a globally visible memory; and obtaining the data from the globally visible memory in response to the cache miss within the second memory cache.

4. The method of claim 3, wherein the second current step value is equal to the first current step value.

5. The method of claim 2, further comprising:

obtaining data from the memory cache corresponding to the first processing element in response to the cache miss within the second memory cache.

6. The method of claim 1, further comprising:

examining at least one cache directory entry within the memory cache;

comparing a local step value within the at least one cache directory entry with the first current step value; and if the local step value and the first current step value do not match, invalidating the cache directory entry.

7. The method of claim 1, wherein the first current step value is stored in a register within a memory cache controller.

8. A computer readable storage medium containing a program which, when executed, performs an operation, comprising:

setting a first current step value representing a first dynamic spatial index for the three-dimensional scene at a first point in time, the first dynamic spatial index being stored in a first address range of a memory cache, the memory cache further storing a static spatial index for the three-dimensional scene in a second address range of the memory cache;

creating a cache directory entry having a local step value in a cache directory within the memory cache, wherein the cache directory entry corresponds to data within the memory cache, wherein the data represents the first dynamic spatial index, wherein the local step value represents at least one of: (i) the first dynamic spatial index and (ii) a second dynamic spatial index for the three-dimensional scene at a second point in time prior to the first point in time;

receiving a request to retrieve data at an address corresponding to the cache directory entry;

comparing at least the local step value with the first current step value to determine if at least one of a cache hit or a cache miss occurs; and upon determining that a cache miss occurs, invalidating the second dynamic spatial index without invalidating the static spatial index.

9. The computer readable storage medium of claim 8, wherein the memory cache corresponds to a first processing element; and wherein the operations further comprise:

providing a second current step value within a second memory cache, wherein the second memory cache corresponds to a second processing element;

providing a cache directory entry within a second memory cache containing at least a second local step value and corresponds to data within the second memory cache;

receiving a request for data at an address corresponding to the cache directory entry within the second memory cache; and determining a cache miss occurs within the second memory cache by comparing at least the second local step value of the cache directory entry within the second memory cache with the second current step value.

10. The computer readable storage medium of claim 9, wherein the operations further comprise:

flushing data within the memory cache associated with the first processing element back to a globally visible memory; and obtaining the data from the globally visible memory in response to the cache miss within the second memory cache.

11. The computer readable storage medium of claim 9, wherein the operations further comprise:

obtaining data from the memory cache corresponding to the first processing element in response to the cache miss within the second memory cache.

12. The computer readable storage medium of claim 9, wherein the second current step value is equal to the first current step value.

13. The computer readable storage medium of claim 8, wherein the operations further comprise:

examining at least one cache directory entry within the memory cache;

comparing a local step value within the at least one cache directory entry with the first current step value; and if the step value and the first current step value do not match, invalidating the cache directory entry.

14. The computer readable storage medium of claim 8, wherein the first current step value is stored in a register within a memory cache controller.

15. A system, comprising:

a first processing element; and a memory cache associated with the first processing element comprising:

a cache data store;

a cache directory; and a cache controller containing a current step value representing a first dynamic spatial index for the three-dimensional scene at a first point in time, the first dynamic spatial index being stored in a first address range of the memory cache, the memory cache further storing a static spatial index for the three-dimensional scene in a second address range of the memory cache, the cache controller being configured to:

create a cache directory entry in the cache directory having a local step value representing at least one of:

(i) the first dynamic spatial index and (ii) a second dynamic spatial index for the three-dimensional scene at a second point in time prior to the first point in time, the cache directory entry corresponding to data within the cache data store, wherein the data represents the first dynamic spatial index;

receive a request to retrieve data at an address corresponding to the memory directory entry;

in response to receiving the request for data, compare the step value of the cache directory entry with the current step value to determine if at least one of a cache hit or a cache miss occurs; and upon determining that a cache miss occurs, invalidating the second dynamic spatial index without invalidating the static spatial index.

16. The system of claim 15, further comprising:
a second processing element;
and a memory cache associated with the second processing element comprising:
a data array;
a cache directory containing a cache directory entry containing at least a second local step value and corresponding to data within the data array; and
cache controller logic containing a second current step value, and the cache controller logic configured to:

receive a request for data at an address corresponding to the cache directory entry within the second memory cache; and determine a cache miss occurs within the second memory cache by comparing at least the second local step value of the cache directory entry within the second memory cache with the second current step value.

17. The system of claim 16, further comprising:
globally visible memory; and
logic configured to flush data within the memory cache associated with the first processing element to the globally visible memory; and
wherein the memory cache associated with the second processing element is configured to:
obtain the data from the globally visible memory in response to the cache miss within the second memory cache.

18. The system of claim 16, wherein the second processing element is configured to obtain data from the memory cache corresponding to the first processing element in response to the cache miss within the second memory cache.

19. The system of claim 15, further comprising:
logic configured to examine at least one cache directory entry within the memory cache; compare a local step value within the at least one cache directory entry with the first current step value; and if the local step value and the first current step value do not match, invalidate the cache directory entry.

20. The system of claim 15, wherein the first current step value is stored in a register within the cache controller.

* * * * *